United States Patent [19]

Frisk et al.

[11] Patent Number: 4,994,310

[45] Date of Patent: Feb. 19, 1991

[54] FLEXIBLE PACKING LAMINATE IN THE FORM OF SHEETS OR OF A WEB, A METHOD FOR THE MANUFACTURE OF THE LAMINATE AND PACKING CONTAINERS MANUFACTURED FROM THE LAMINATE

[75] Inventors: Peter Frisk, Malmö ; Lars Löfgren, Staffanstorp, both of Sweden

[73] Assignee: Roby Teknik Aktiebolag, Lund, Sweden

[21] Appl. No.: 277,809

[22] Filed: Nov. 30, 1988

[30] Foreign Application Priority Data

Dec. 1, 1987 [SE] Sweden .................................. 8704789

[51] Int. Cl.$^5$ .......................... B65D 1/00; B32B 15/08
[52] U.S. Cl. ..................................... 428/34.2; 427/404;
427/411; 428/35.9; 428/476.3; 428/479.6
[58] Field of Search ................. 428/458, 461, 36.7,
428/34.2, 35.9, 522, 476.3, 479.6; 427/404, 411

[56] References Cited

U.S. PATENT DOCUMENTS

| | | | |
|---|---|---|---|
| 3,574,668 | 4/1971 | Cherney | 428/34.2 |
| 4,095,013 | 6/1978 | Burger | 428/522 |
| 4,533,576 | 8/1985 | Tanahashi et al. | 428/458 X |
| 4,614,208 | 9/1986 | Skarelius | 428/36.7 |
| 4,753,832 | 6/1988 | Brown et al. | 428/34.2 |

FOREIGN PATENT DOCUMENTS

| | | |
|---|---|---|
| 3601650 | 7/1986 | Fed. Rep. of Germany . |
| 2182164 | 7/1973 | France . |
| 921877 | 4/1982 | U.S.S.R. . |
| 1071910 | 6/1967 | United Kingdom . |

*Primary Examiner*—Thomas J. Herbert
*Attorney, Agent, or Firm*—Burns, Doane, Swecker & Mathis

[57] ABSTRACT

In the manufacture of packing containers by means of folding of laminate in the form of sheets or of a web of the type which comprises a relatively thick carrier layer (2) of paper or cardboard and a gas-tight, thin metal foil (5) the laminate is subjected to stresses which, particularly within folding regions comprising multiple material thicknesses, may be so strong that crack formations occur in the metal foils protecting against gas which are sensitive to tension, thus entailing the risk of the intended gas barrier characteristics of the packing container being impaired or wholly lost. To counteract this risk the packing laminate is provided with a layer (6) of ethylvinyl alcohol laminated between the metal foil (5) and the carrier layer (2) which for one thing is mechanically sufficiently durable to withstand the external stresses during the folding of the laminate, and for another has sufficiently good gas barrier properties to compensate for the loss in gas tightness which thus may arise if the integrity of the metal foil (5) is lost during the manufacture of the container. Preferably the laminate is provided also with a further layer (7) of a material permeable to moisture which is laminated between the ethylvinyl alcohol layer (6) and the carrier layer (2) and which is adapted to let through moisture which from the liquid-filled inside of the container might be able to penetrate into the ethylvinyl alcohol layer (5) through such crack formations in the metal foil (5). As a result the moisture content in the ethylvinyl alcohol layer (6) can be kept at a sufficiently low level so as not to have a negative effect on the gas barrier characteristics of the ethylvinyl alcohol layer (6) which otherwise diminish with increasing moisture content.

9 Claims, 1 Drawing Sheet

FLEXIBLE PACKING LAMINATE IN THE FORM OF SHEETS OR OF A WEB, A METHOD FOR THE MANUFACTURE OF THE LAMINATE AND PACKING CONTAINERS MANUFACTURED FROM THE LAMINATE

BACKGROUND OF THE INVENTION

The present invention relates to a flexible packing laminate in the form of sheets or of a web intended for the manufacture of packing containers with good gas barrier characteristics. The laminate comprises a carrier a layer of dimensionally rigid, but foldable, material and a gas-tight metal foil laminated to one side of the carrier layer. The invention also relates to a method for the manufacture from the laminate. Moreover, the invention relates to the utilization of such a laminate for the manufacture of packing containers.

In the technology of packaging, the use of consumer packages of non-returnable character has been known for a long time for the packaging and handling of, among other things, liquid foodstuffs such as milk, juice etc. A very prevalent group of these so-called non-returnable packages is manufactured from a material having a carrier layer of paper or cardboard and outer and inner liquid-tight coatings of plastics, usually thermoplastics. In many cases, depending on the product which is to be packed, the material in these packages is also provided with further layers of other material, e.g. aluminium foil or plastic layers, in addition to those mentioned here.

The composition of the packing material is aimed at creating the best possible protection for the product which is to be packed, while also providing the packages with sufficient mechanical strength and dimensional stability so as to make possible a convenient handling. To bring about mechanical rigidity that provides mechanical protection for the product and makes the package dimensionally stable so that it can be readily transported and gripped by hand, the material in these packages is often provided with a relatively thick carried layer of paper or cardboard. Such a material, however, has no protection from liquids or gases and the good rigidity in the material is rapidly lost, if it is subjected to moisture or liquid which is absorbed into the material. Frequently, to impart liquid-tightness to the material both sides, the carrier layer are provided, with a plastic coating. If this coating is thermo-plastic, it can be used for sealing plastic layers to one another through so-called heat-sealing. In this manner, packing containers can be sealed and made to remain in their intended shape by heat-sealing thermoplastic-coated, overlapping material panels to one another in a tight and durable sealing joint.

Packing containers of the type mentioned here are manufactured either from blanks punched out in advance or from a web which has been prepared with appropriate decoration and with a crease line pattern facilitating the folding. Packing containers are manufactured from such a web by joining together the longitudinal edges of the web in an overlap joint so as to form a tube. The tube is subsequently filled with the intended contents and divided into closed container units through repeated transverse seals of the tube at right angles to the longitudinal axis of the tube. After suitable folding of the packing material into the tube, the material in the container units is converted to the desired geometrical shape. Generally, a parallelpided geometry is desired wherein the tube is provided with longitudinal folding lines and with double-walled, triangular folding lugs at the corner of the packing container.

During the forming of the packing container, the laminated packing material is subjected to stresses which become especially great during the folding course of the material. Due to the magnitude of the material thickness of the carrier layer, the folding the plastic coating on one side to be subjected to strong stretching while the plastic coating on the other side is compressed to a corresponding degree along the folding line. Because of the considerable extensibility of the plastic coatings, such a material folding only rarely causes the plastic coating to break or be damaged and lose its liquid-tightness. However, the situation is aggravated if the packing material also comprises an aluminum foil coating because aluminum foil has a low extensibility with respect to the plastic coatings and thus tends to crack during folding of the material.

Even though a single 180° fold of the packing material normally will not have any serious consequences regarding liquid-tightness and gas-permeability, considerable difficulties arise, however, when the material is to be folded along two crossing crease lines (so-called crossings). This is often the case in external sealing regions which occur on this particular type of packing container. Generally, to form the seals, the plastic coatings facing towards the inside of the packing container are heated to a melting point along the edge zone which are to be sealed to one another. The heated plastic layers are then pressed against one another to form a sealing fin and are held together through material fusion on the outside of the packing container. Such a sealing fin comprises double material layers, and so as not to be an obstacle, the sealing fin often is folded down to lie flat against the outside of the packing container. Consequently one of the material layers of the sealing fin undergoes 180° folding. The container wall in the region of the folded down sealing fin thus comprises three material layers, i.e., has a threefold material thickness. Such a sealing fin often runs along one or more of the lateral surfaces of the packing container that are subjected to a 180° folding along a crease line at rignt angles to the sealing fin when forming parallelpipedic packages. Consequently, the material thickness in certain regions of the packing container will amount to six times the thickness of the laminate. During such a 180° folding transversely to the sealing region, the outermost coated material layer will be subjected to very strong tensile stresses with subsequent extensions and crack formations in the material. These tensile forces often are so great that not only the aluminium foil included in the laminate, but also the thermoplastic coating crack, such that the packing container wall loses its liquid tightness characteristics in these particularly exposed regions of the packing container.

SUMMARY OF THE INVENTION

In accordance with the present invention, it has been found, that the risk of a packing laminate of the type described above here losing its barrier characteristic, especially its gas-tightness, because of such crack formations in the metal foil of the laminate, can be substantially reduced, or even be wholly eliminated, if the packing laminate between the carrier layer and the metal foil is provided with a layer of ethylvinyl alcohol. Such a material layer can be made sufficiently durable so as to resist the strong stresses in connection with the folding of the laminate while maintaining sufficient gas barrier characteristics to compensate effectively for the loss of gas-tightness which may occur in the main gas barrier of the packing laminate (metal foil). A further valuable property of such an ethylvinyl alcohol layer is that it can be laminated directly between such layers by extrusion without the use of intermediate extra adhesive.

BRIEF DESCRIPTION OF THE DRAWINGS

The invention, whose characteristics are evident from the subsequent claims will now be described with special reference to tha attached drawing wherein

DETAILED DESCRIPTION

Figure 1:
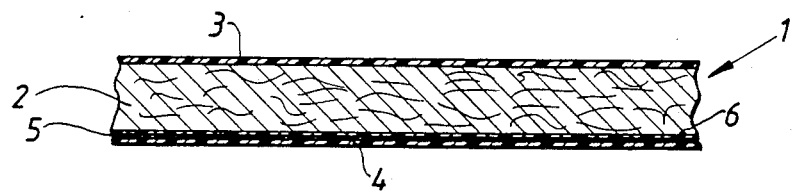
FIG. 1 shows schematically a cross-section through a packing laminate in the form of sheets or of a web in accordance with the invention.

The packing laminate 1 in FIG. 1 comprises a relatively thick carrier layer 2 of paper or cardboard and outer coatings 3 and 4 of plastics, preferably thermoplastics. Between the carrier layer 2 and the one outer plastic layer 4, which is intended to face towards the inside of the packing container, there is a thin aluminium foil 5 which constitutes the main gas barrier of the laminate. With the object of improving the gas barrier characteristics of the material, the laminate 1 in accordance with the invention includes a layer 6 of ethylvinyl alcohol between the carrier layer 2 and the aluminium foil 6. The layer 6 is durable to resist the external stresses to which the packing laminate is subjected in connection with being converted to packing containers, and the layer 6 is also made to retain sufficient gas barrier characteristics to compensate for the loss in gas tightness which the laminate experiences if small crack formations or corresponding leakage were to occur in the aluminium foil.

Figure 2:
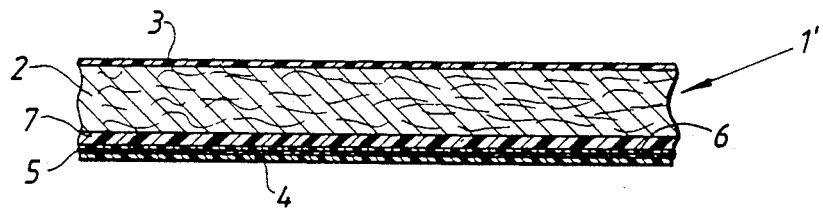
FIG. 2 shows a section through a packing laminate in accordance with a preferred with a preferred embodiment of the invention.

FIG. 2 shows a packing laminate 1' in accordance with a preferred embodiment of the invention. To achieve greater clarity the same reference designations have been used as in FIG. 1 for identical material layers. The packing laminate 1' in FIG. 2 differs from the laminate according to FIG. 1 in that a layer 7 of moisture-permeable material is provided between the layer of ethylvinyl alcohol 6 and the carrier layer 2. The material layer 7 serves to absorb any moisture which might be able to penetrate into the ethylvinyl alcohol layer 6 through crack formations in the aluminium foil 5 and the inner plastic coating 4. If the moisture is not otherwise absorbed by material layer 7 and is present in sufficiently large quantities, 39 the gas barrier characteristics of the ethylvinyl alcohol layer could be impaired and thereby cause it to be less effective with the invention. The material layer 7 is, in general, not necessary, but is preferred if the packing laminate is in danger of being subjected to external stresses wherein not only the aluminium foil 5, but also the inner plastic coating 4 are liable to undergo crack formations. The material layer 7 preferably consists of a polyamide, e.g. nylon 6, which possesses good adhesive powers with respect of the ethylvinyl alcohol layer 6 as well as the paper or cardboard layer 2 and, therefore, is easy to laminate between these two layers through extrusion without the use of extra intermediate adhesive layers.

Figure 3:
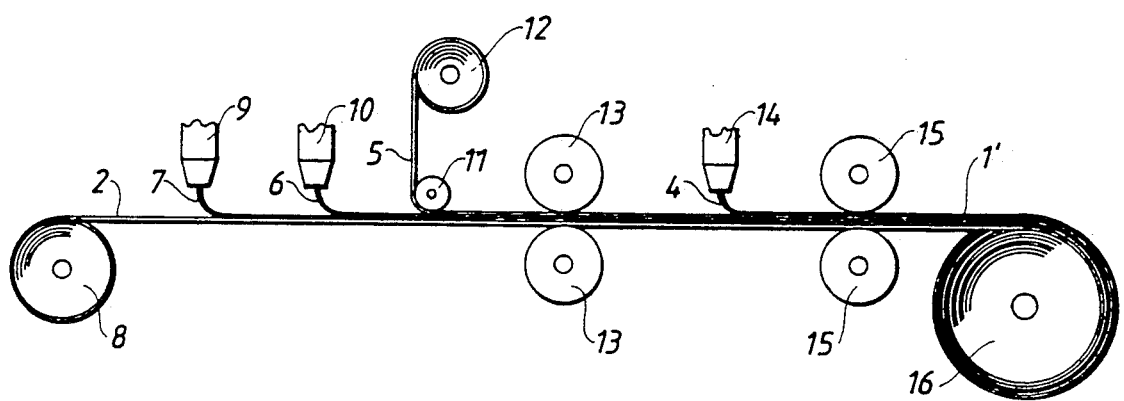
FIG. 3 shows schematically an arrangement by means of which a packing laminate of the type which is shown in FIG. 2 can be manufactured.

A packing laminate which works well according to the invention can be built up of material layers laminated to one another of the material thicknesses given below:

outer plastic coating 3-approx. 10 μm
paper or carboard layer 2-approx. 300 μm
ployamide layer 7, 15-25 μm, (preferably 20 min)
ethyvinyl alcohol layer 6, 3-10 μm, (preferably 5 min)
aluminium foil 5-approx. 5 μm.
one or more outer plastic coatings 4 approx 10 μm each The packing laminate in accordance with the invention can be manufactured in the manner which is illustrated in FIG. 3. A web 2 of paper or cardboard, which on one side (FIG. 3 bottom) is coated with an extruded plastic layer 3, is reeled off a magazine roll 8 and is guided past a first extruder 9. First extruder 9 deposits a layer 7 of molten polyamide on the free side of the web, which is then guided past a second extruder 10. The second extruder of deposits a layer of 10 molten ethylvinyl alcohol on top of the polyamide layer and the web is then guided deflection roller 11, lightly pressed against the web, which guides an aluminium foil 5, reeled off a magazine roll 12, to lie flat against the traveling web. In accordance with the invention, the said two layers 6 and 7 may be applied, at the same time by means of co-extrusion which has been found to give advantageous results. From the deflection roller 11, the web so laminated is advanced to, and through, the nip between two co-rotational cooling rolls 13 which are pressed against each other with a light pressure and which compress and cool the previously deposited layers so that they are lastingly joined together. From the cooling rolls 13, the laminated web is advanced further past one or several further extruders 14 which bring on one or more further plastic coats 4. The laminate so coated with plastics finally is passed through the nip between a further pair of co-rotational cooling rolls 15 which compress the laminated material layer to form the finished, well-coherent packing laminate 1', the laminate is thereafter wound up on a magazine roll 16.

What is claimed is:

1. A packing laminate for packing containers comprising,
    a rigid and foldable carrier layer,
    a gas-tight metal foil layer disposed on one side of said carrier layer, and
    an ethylvinyl alcohol layer produced through extrusion disposed between said carrier layer and said metal foil layer, said ethylvinyl alcohol layer attached directly to the metal foil.

2. A packing container manufactured from a packing laminate according to claim 1.

3. A packing laminate in accordance with claim 1 wherein one side of the carrier layer faces away from said ethylvinyl alcohol layer and has a thin coating of liquid-tight material.

4. A packing laminate in accordance with claim 1 wherein said laminate further comprises a layer of moisture-permeable material disposed between the ethylvinyl alcohol layer and the carrier layer.

5. A packing laminate in accordance with claims 4, wherein the moisture-permeable comprises a polyamide.

6. A packing laminate in accordance with claim 4, wherein the moisture-permeable layer is produced through extrusion and is attached directly to the ethylvinyl alcohol layer and the carrier layer.

7. A packing laminate in accordance with claim 1, wherein one side of the metal foil is coated with at least one coating of liquid-tight material.

8. A packing laminate in accordance with claim 7 wherein said at least one coating is comprised of extruded thermoplastics.

9. A method of manufacturing a packing laminate for packing containers comprising the following steps:
   depositing an extruded coating of moisture-permeable material on a rigid and foldable material web,
   depositing an extruded coating of ethylvinyl alcohol on said extruded coating of moisture-permeable material, and
   arranging a metal foil over said extruded coating of ethylvinyl alcohol.

* * * * *